US012071320B2

(12) United States Patent
Arimori et al.

(10) Patent No.: US 12,071,320 B2
(45) Date of Patent: Aug. 27, 2024

(54) MEDIUM TRANSPORT APPARATUS, IMAGE READ APPARATUS, JAM DETECTION METHOD, AND STORAGE MEDIUM

(71) Applicant: Seiko Epson Corporation, Tokyo (JP)

(72) Inventors: Kazuhiko Arimori, Kitakyushu (JP); Kosuke Nomoto, Shiojiri (JP); Makoto Wada, Kitakyushu (JP); Masaya Yamasaki, Kitakyushu (JP); Hiromichi Kitsuki, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 306 days.

(21) Appl. No.: 17/648,335

(22) Filed: Jan. 19, 2022

(65) Prior Publication Data

US 2022/0234855 A1 Jul. 28, 2022

(30) Foreign Application Priority Data

Jan. 22, 2021 (JP) ................................ 2021-008554

(51) Int. Cl.
*B65H 7/06* (2006.01)
*B41J 11/00* (2006.01)
*B65H 5/06* (2006.01)

(52) U.S. Cl.
CPC .............. *B65H 7/06* (2013.01); *B41J 11/006* (2013.01); *B65H 5/062* (2013.01); *B65H 2553/80* (2013.01)

(58) Field of Classification Search
CPC ...... B65H 7/06; B65H 5/062; B65H 2553/80; B41J 11/006
See application file for complete search history.

(56) References Cited

U.S. PATENT DOCUMENTS

| | | | | |
|---|---|---|---|---|
| 5,806,650 | A * | 9/1998 | Mennie | G07F 19/20 271/902 |
| 2012/0063791 | A1* | 3/2012 | Iwanaga | B41J 11/006 399/21 |
| 2019/0104228 | A1 | 4/2019 | Arimori et al. | |
| 2022/0162025 | A1* | 5/2022 | Suzuki | B65H 5/062 |

FOREIGN PATENT DOCUMENTS

| | | | |
|---|---|---|---|
| JP | 2005-073035 | | 3/2005 |
| JP | 2018-30296 | * | 3/2018 |
| JP | 2019-68175 | * | 4/2019 |
| JP | 2019-068175 | | 4/2019 |

OTHER PUBLICATIONS

Machine translation of JP2018-30296 (Year: 2018).*
Machine translation of JP2019-68175 (Year: 2019).*

* cited by examiner

*Primary Examiner* — Thomas A Morrison
(74) *Attorney, Agent, or Firm* — WORKMAN NYDEGGER

(57) ABSTRACT

A medium transport apparatus includes a controller that determines how many transport roller pairs disposed on a medium transport route are transporting a medium, based on detection information from detectors disposed in relation to respective transport roller pairs. Then, the controller sets a threshold to a larger value as a larger number of transport roller pairs are transporting the medium and sets the threshold to a lower value as a smaller number of transport roller pairs are transporting the medium.

10 Claims, 10 Drawing Sheets

MEDIUM TRANSPORT APPARATUS, IMAGE READ APPARATUS, JAM DETECTION METHOD, AND STORAGE MEDIUM

The present application is based on, and claims priority from JP Application Serial Number 2021-008554, filed Jan. 22, 2021, the disclosure of which is hereby incorporated by reference herein in its entirety.

BACKGROUND

1. Technical Field

The present disclosure relates to a medium transport apparatus that transports a medium and to an image read apparatus with the medium transport apparatus. Furthermore, the present disclosure relates to a jam detection method in which the medium transport apparatus detects a medium jam. Moreover, the present disclosure relates to a storage medium that stores a program that causes the medium transport apparatus to perform the jam detection method.

2. Related Art

Sheet-feed types of image read apparatuses, which are one example of image read apparatuses, are configured to read a medium being transported by a medium transport apparatus. Some medium transport apparatuses are equipped with jam detectors. As an example, JP-A-2019-68175 discloses an image read apparatus having a medium transport apparatus that, when a drive load exceeding a preset threshold is placed on a motor that rotates a roller to feed a medium, determines that a medium jam occurs and then steps the rotation of the motor.

In an image read apparatus as described above, if a plurality of transport roller pairs are arranged along a medium transport route and rotated by a single motor, for example, a drive load on the motor depends on how many transport roller pairs are transporting a medium. Therefore, it is necessary to set a threshold for jam detection, based on the drive load on the motor when a maximum number of transport roller pairs are transporting a medium.

In the above case, however, when a minimum number of transport roller pairs are transporting a medium, the drive load may excessively differ from the threshold. Thus, it might take a long time for the drive load to exceed the threshold after a medium jam has occurred. This increases the risk of the medium jam worsened and seriously damaging the medium and the transport mechanism.

SUMMARY

According to a first aspect of the present disclosure, a medium transport apparatus includes: a medium placement section on which a medium to be transported is placed; a medium transport route along which the medium fed from the medium placement section is transported; a plurality of transport roller pairs disposed on the medium transport route; a motor that operates as a power source for the plurality of transport roller pairs; and a controller that controls the motor. The controller is configured to perform a jam detection process to detect whether the medium jams on the medium transport route by referring to a drive load on the motor and a threshold related to the drive load. The plurality of transport roller pairs are provided with respective detectors disposed on the medium transport route, the detectors being configured to detect the medium. The controller varies the threshold based on detection information from the detectors.

According to a second aspect of the present disclosure, an image read apparatus includes: a reader that reads a surface of a medium being transported; and the above-described medium transport apparatus that transports the medium.

According to a third aspect of the present disclosure, a jam detection method is performed by a medium transport apparatus that includes a medium placement section on which a medium to be transported is placed, a medium transport route along which the medium fed from the medium placement section is transported, a plurality of transport roller pairs disposed on the medium transport route, and a motor that operates as a power source for the plurality of transport roller pairs. In the jam detection method, the medium transport apparatus detects whether the medium jams on the medium transport route by referring to a drive load on the motor and a threshold related to the drive load. The jam detection method includes: determining how many transport roller pairs are transporting the medium, based on detection information from a plurality of detectors, the detectors being disposed on the medium transport route in relation to the respective transport roller pairs, the detectors being configured to detect the medium; and setting the threshold to a larger value as a larger number of transport roller pairs are transporting the medium and setting the threshold to a lower value as a smaller number of transport roller pairs are transporting the medium.

According to a fourth aspect of the present disclosure, a non-transitory computer-readable storage medium stores a program that causes a medium transport apparatus to perform a jam detection method. The medium transport apparatus includes a medium placement section on which a medium to be transported is placed, a medium transport route along which the medium fed from the medium placement section is transported, a plurality of transport roller pairs disposed on the medium transport route, and a motor that operates as a power source for the plurality of transport roller pairs. In the jam detection method, the medium transport apparatus detects whether the medium jams on the medium transport route by referring to a drive load on the motor and a threshold related to the drive load. The jam detection method includes: determining how many transport roller pairs are transporting the medium, based on detection information from a plurality of detectors, the detectors being disposed on the medium transport route in relation to the respective transport roller pairs, the detectors being configured to detect the medium; and setting the threshold to a larger value as a larger number of transport roller pairs are transporting the medium and setting the threshold to a lower value as a smaller number of transport roller pairs are transporting the medium.

DESCRIPTION OF EXEMPLARY EMBODIMENTS

Figure 1:
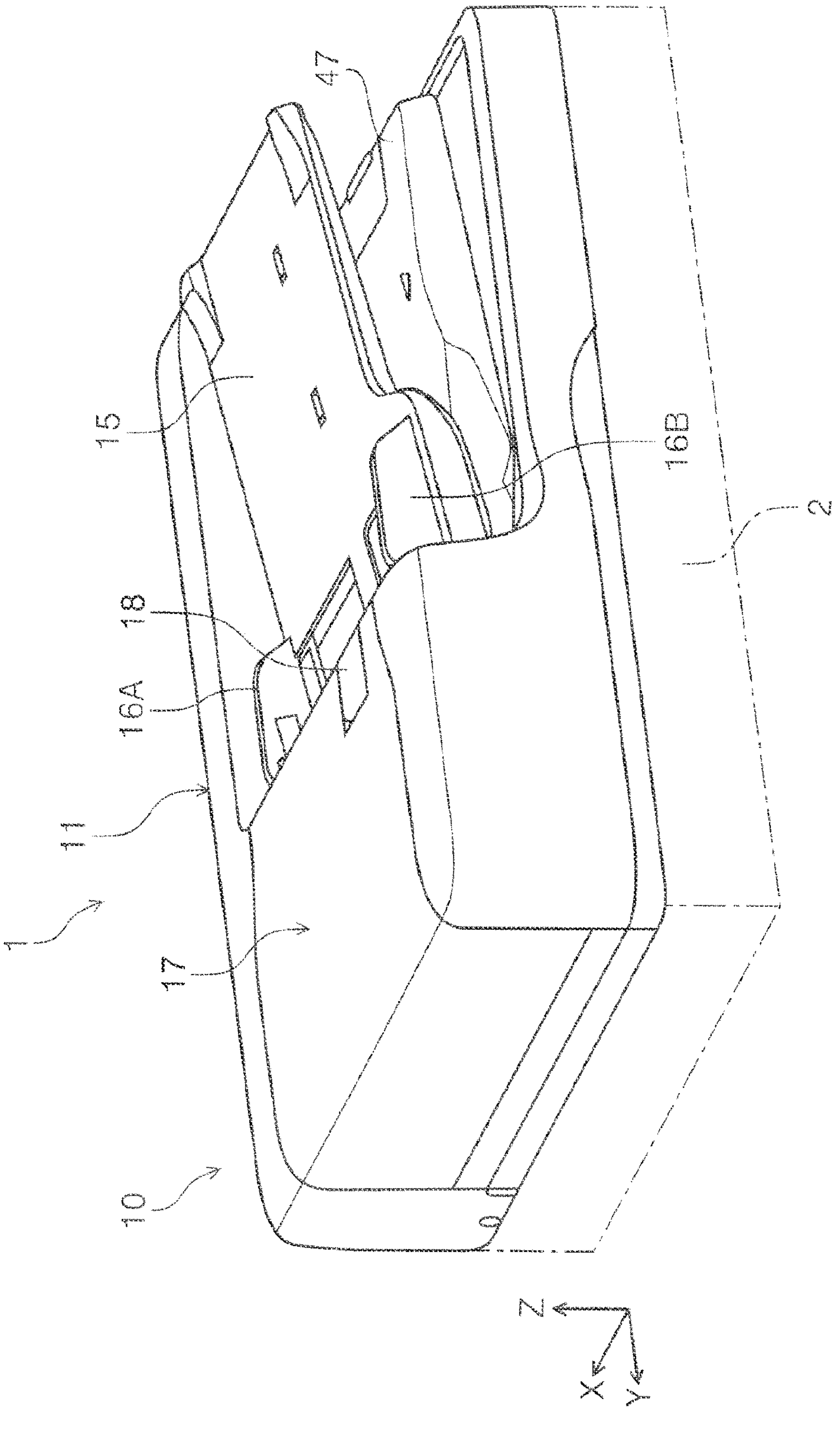
FIG. 1 is a top perspective view of a medium transport apparatus according to an embodiment of the present disclosure.

Some aspects of the present disclosure will be described below briefly. According to a first aspect of the present disclosure, a medium transport apparatus includes: a medium placement section on which a medium to be transported is placed; a medium transport route along which the medium fed from the medium placement section is transported; a plurality of transport roller pairs disposed on the medium transport route; a motor that operates as a power source for the plurality of transport roller pairs; and a controller that controls the motor. The controller is configured to perform a jam detection process to detect whether the medium jams on the medium transport route by referring to a drive load on the motor and a threshold related to the drive load. The plurality of transport roller pairs are provided with respective detectors disposed on the medium transport route, the detectors being configured to detect the medium. The controller varies the threshold based on detection information from the detectors. More specifically, the controller may determine how many transport roller pairs are transporting the medium, based on the detection information from the detectors. Then, the controller may set the threshold to a larger value as a larger number of transport roller pairs are transporting the medium and may set the threshold to a lower value as a smaller number of transport roller pairs are transporting the medium.

With regard to the above first aspect, the controller may determine how many transport roller pairs are transporting the medium, based on the detection information from the detectors. Then, the controller may set the threshold to a larger value as a larger number of transport roller pairs are transporting the medium and may set the threshold to a lower value as a smaller number of transport roller pairs are transporting the medium. In short, the controller may vary the threshold in accordance with the number of transport roller pairs transporting the medium, namely, in accordance with the drive load on the motor. This configuration, when a small number of transport roller pairs transport the medium, can suppress the drive load for the motor from greatly differing from the threshold, thereby detecting a medium jam in a short time. Consequently, it is possible to reduce the risk of the medium jam being worsened and seriously damaging the medium and the transport mechanism.

According to a second aspect of the present disclosure, the medium transport apparatus may include, in addition to the configuration of the first aspect, a configuration in which the controller varies the threshold, depending on where the medium is positioned on the medium transport route.

Although it depends on the configuration of the medium transport route, the drive load on the motor may vary with the location of the medium on the medium transport route. With regard to the above second aspect, however, the controller may vary the threshold, depending on where the medium is positioned on the medium transport route. Thus, this configuration can set the threshold to a proper value, thereby detecting a medium jam precisely.

According to a third aspect of the present disclosure, the medium transport apparatus may further include, in addition to the configuration of the second aspect, a separation roller pair that separates a plurality of media fed from the medium placement section, the separation roller pair being disposed on the medium transport route upstream of the plurality of transport roller pairs. The controller may set the threshold in such a way that the threshold when the medium is not nipped in the separation roller pair is lower than the threshold when the medium is nipped in the separation roller pair.

If a separation roller pair that separates a plurality of media fed from the medium placement section is disposed on the medium transport route upstream of the plurality of transport roller pairs, when a medium is nipped in the separation roller pair, the separation roller pair places a load on the transport roller pair during the transport of the medium, making the drive load on the motor heavier. In this configuration, if the controller uniquely sets that threshold that has been determined when the medium is nipped in the separation roller pair, the drive load on the motor may greatly differ from the threshold when the medium is not nipped in the separation roller pair. In such cases, it might take a long time to detect a medium jam. With regard to the above third aspect, however, the controller may set the threshold in such a way that the threshold when the medium is not nipped in the separation roller pair is lower than the threshold when the medium is nipped in the separation roller pair. Thus, this configuration can suppress the drive load on the motor from greatly differing from the threshold when the medium is not nipped in the separation roller pair, thereby detecting a medium jam in a short time.

According to a fourth aspect of the present disclosure, the medium transport apparatus may include, in addition to the configuration of the second aspect, a configuration in which the medium transport route is a route along which the medium fed from the medium placement section is transported in a first direction, is curved downward and inverted, and is transported in a second direction that is opposite to the first direction. The medium transport route may have a first zone and a second zone, a curvature of the medium within the first zone being lower than a curvature of the medium within the second zone. The controller may set the threshold in such a way that the threshold when an upstream side of the medium is positioned within the first zone of the medium transport route is lower than the threshold when the upstream side of the medium is positioned within the second zone of the medium transport route.

When the upstream side of a medium moves along a curved route, for example, the drive load on the motor depends on the curvature of this route. Thus, if the controller uniquely sets the threshold that has been determined when the upstream side of the medium is positioned on a portion of a route which has a greater curvature, the drive load on the motor may greatly differ from the threshold when the medium is positioned on a portion of the route which has a smaller curvature. In such cases, it might take a long time to detect a medium jam. With regard to the above fourth aspect, however, when the medium transport route has a first zone and a second zone, a curvature of the medium within the first zone being lower than a curvature of the medium within the second zone, the controller may set the threshold in such a way that the threshold when an upstream side of the medium is positioned within the first zone of the medium transport route is lower than the threshold when the upstream side of the medium is positioned within the second zone of the medium transport route. This configuration can suppress the drive load on the motor from greatly differing from the threshold when the upstream side of the medium is positioned within the first zone, thereby detecting a medium jam in a short time.

According to a fifth aspect of the present disclosure, the medium transport apparatus may include, in addition to the configuration of one of the first to fourth aspects, a configuration in which, when transporting a first medium and a second medium, rigidity of the first medium being lower than rigidity of the second medium, the controller sets the threshold in such a way that the threshold during transport of the first medium is lower than the threshold during transport of the second medium.

As the rigidity of the medium increases, the drive load on the motor also increases. Thus, if the controller uniquely sets the threshold that has been determined when a medium has higher rigidity, the drive load on the motor may greatly differ from the threshold during the transport of a medium having lower rigidity. In such cases, it might take a long time to detect a medium jam. With regard to the above fifth aspect, however, when transporting a first medium and a second medium, rigidity of the first medium being lower than rigidity of the second medium, the controller may set the threshold in such a way that the threshold during transport of the first medium is lower than the threshold during transport of the second medium. Thus, this configuration can suppress the drive load on the motor from greatly differing from the threshold during the transport of a medium having low rigidity, thereby detecting a medium jam in a short time.

According to a sixth aspect of the present disclosure, an image read apparatus includes: a reader that reads a surface of a medium being transported; and the medium transport apparatus according to one of the first to fifth aspects which transports the medium.

With regard to the above sixth aspect, the image read apparatus provides substantially the same functions and effects as the medium transport apparatus according to any of the above first to fifth aspects.

According to a seventh aspect of the present disclosure, the image read apparatus may include, in addition to the configuration according to the sixth aspect, a configuration in which the controller sets a rotational speed of the motor to a lower value as a larger number of transport roller pairs are transporting the medium and sets the rotational speed of the motor to a larger value as a smaller number of transport roller pairs are transporting the medium.

When a smaller number of transport roller pairs transport a medium, the medium is more likely to slip over those transport roller pairs and be fed by an insufficient amount. In this case, the reader may fail to clearly read the surface of the medium. With regard to the above seventh aspect, however, the controller may set the rotational speed of the motor to a lower value as a larger number of transport roller pairs are transporting the medium and may set the rotational speed of the motor to a larger value as a smaller number of transport roller pairs are transporting the medium. Thus, this configuration can feed a medium by an amount suitable for the number of transport roller pairs transporting the medium, thereby enabling the reader to clearly read the surface of the medium.

According to an eighth aspect of the present disclosure, the image read apparatus may include, in addition to the configuration according to the sixth or seventh aspect, a configuration in which, when transporting a first medium and a second medium, rigidity of the first medium being higher than rigidity of the second medium, the controller sets the rotational speed of the motor in such a way that the rotational speed during transport of the first medium is higher than the rotational speed during transport of the second medium.

When the transport roller pairs transport a medium having higher rigidity, the medium is more likely to slip over the transport roller pairs and be fed by an insufficient amount. In this case, the reader may fail to clearly read the surface of the medium. With regard to the eighth aspect, however, when transporting a first medium and a second medium, rigidity of the first medium being higher than rigidity of the second medium, the controller may set the rotational speed of the motor in such a way that the rotational speed during transport of the first medium is higher than the rotational speed during transport of the second medium. Thus, this configuration can feed a medium by an amount suitable for the rigidity of the medium, thereby enabling the reader to clearly read the surface of the medium.

According to a ninth aspect of the present disclosure, a jam detection method is performed by a medium transport apparatus that includes a medium placement section on which a medium to be transported is placed, a medium transport route along which the medium fed from the medium placement section is transported, a plurality of transport roller pairs disposed on the medium transport route, and a motor that operates as a power source for the plurality of transport roller pairs. In the jam detection method, the medium transport apparatus detects whether the medium jams on the medium transport route by referring to a drive load on the motor and a threshold related to the drive load. The jam detection method includes: determining how many transport roller pairs are transporting the medium, based on detection information from a plurality of detectors, the detectors being disposed on the medium transport route in relation to the respective transport roller pairs, the detectors being configured to detect the medium; and setting the threshold to a larger value as a larger number of transport roller pairs are transporting the medium and setting the threshold to a lower value as a smaller number of transport roller pairs are transporting the medium.

With regard to the above ninth aspect, the threshold varies in accordance with the number of transport roller pairs transporting a medium, namely, in accordance with the drive load on the motor. Thus, this configuration can suppress the drive load on the motor from greatly differing from the threshold when a small number of transport roller pairs transport a medium, thereby detecting a medium jam in a short time. Consequently, it is possible to reduce the risk of the medium jam being worsened and seriously damaging the medium and the transport mechanism.

According to a tenth aspect of the present disclosure, a non-transitory computer-readable storage medium stores a program that causes a medium transport apparatus to perform a jam detection method. The medium transport apparatus includes a medium placement section on which a medium to be transported is placed, a medium transport route along which the medium fed from the medium placement section is transported, a plurality of transport roller pairs disposed on the medium transport route, and a motor that operates as a power source for the plurality of transport roller pairs. In the jam detection method, the medium transport apparatus detects whether the medium jams on the medium transport route by referring to a drive load on the motor and a threshold related to the drive load. The jam detection method includes: determining how many transport roller pairs are transporting the medium, based on detection information from a plurality of detectors, the detectors being disposed on the medium transport route in relation to the respective transport roller pairs, the detectors being configured to detect the medium; and setting the threshold to a larger value as a larger number of transport roller pairs are transporting the medium and setting the threshold to a lower value as a smaller number of transport roller pairs are transporting the medium.

With regard to the above ninth aspect, the threshold varies in accordance with the number of transport roller pairs transporting a medium, namely, in accordance with the drive load on the motor. Thus, this configuration can suppress the drive load on the motor from greatly differing from the threshold when a small number of transport roller pairs transport a medium, thereby detecting a medium jam in a short time. Consequently, it is possible to reduce the risk of the medium jam being worsened and seriously damaging the medium and the transport mechanism.

Next, some embodiments of the present disclosure will be described below with reference to the accompanying drawings. Those drawings each employ an orthogonal coordinate system, or an X-Y-Z coordinate system. The ±X axes extend along the width of a medium to be transported in a scanner 1 and also along the depth of the scanner 1. In one embodiment, the −X side corresponds to the front side of the scanner 1, and the +X side corresponds to the rear side of the scanner 1. The ±Y axes extend along the width of the scanner 1. As viewed from the front, the −Y side corresponds to the left side of the scanner 1, and the +Y side corresponds to the right side of the scanner 1. The ±Z axes extend along the height of the scanner 1. The −Z side corresponds to the bottom side of the scanner 1, and the +Z side corresponds to the top side of the scanner 1.

As illustrated in FIG. 1, the scanner 1, which is an example of an image read apparatus, includes: a scanner unit 2 that serves as a flatbed scanner; and a medium transport apparatus 10 disposed above the scanner unit 2. The medium transport apparatus 10 is rotatable around a hinge (not illustrated) disposed on the +X side of the scanner unit 2 to be able to cover or expose a glass table 3 (see FIG. 2) on the top of the scanner unit 2. The medium transport apparatus 10 includes a feeder tray 15, a cover 17, a first frame 12 (see FIG. 2), and an ejection tray 47, all of which are disposed in a main body 11.

A medium to be read by the scanner 1 is placed on the feeder tray 15. The feeder tray 15 includes: an edge guide 16A close to the +X side; and an edge guide 16B close to the −X side. On the feeder tray 15, the edge guide 16A can guide the +X-side edge of the medium, and the edge guide 16B can guide the −X-side edge of the medium. The edge guides 16A and 16B are slidable on the feeder tray 15 in the ±X directions so that the distance therebetween is adjustable.

The cover 17 is pivotable around a rotational shaft (not illustrated), the central axis of which is parallel to the ±X axes. The cover 17 has an unlock lever 18; by pulling up the unlock lever 18, a user can release the cover 17 from the closed state and set it in an upright position. When the cover 17 is in an upright position, some components, such as curved inversion route T, inside the medium transport apparatus 10 are exposed, which allows the user to perform a jam recovery process.

Figure 2:
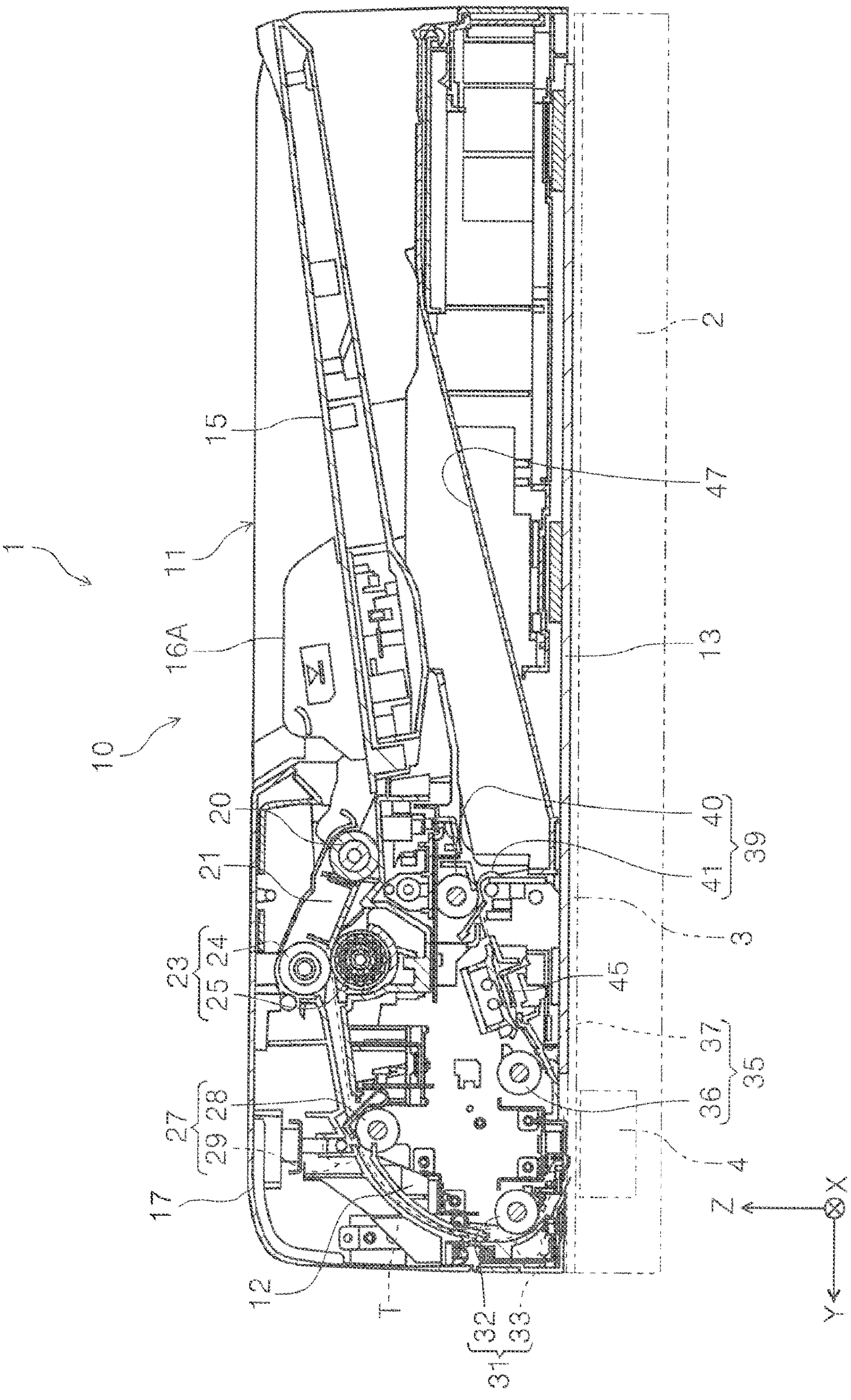
FIG. 2 illustrates the medium transport route inside the medium transport apparatus.

As illustrated in FIG. 2, the scanner unit 2 is provided with the glass table 3, under which a first reader 4 is disposed movably in the ±Y directions. The bottom surface of the medium transport apparatus 10 is provided with a press mat 13 that presses a medium against the glass table 3. Since the press mat 13 is not disposed in the +Y-side area on the bottom surface, the first reader 4 can read the first surface of a medium within this area. The medium transport apparatus 10 also includes a second reader 45 therein, so that the first reader 4 and the second reader 45 can read both the first and second surfaces of a medium in cooperation with each other. Herein, the medium transport apparatus 10 may be regarded as an example of the image read apparatus by itself, because of the second reader 45 disposed therein.

With reference to FIG. 2, the medium transport route inside the medium transport apparatus 10 will be described below. In FIG. 2, the broken line T denotes the curved inversion route inside the medium transport apparatus 10 as the medium transport route. The curved inversion route T extends from a separation roller pair 23 to a fourth transport roller pair 39, both of which will be described later. Herein, a separation or transport roller pair refers to a pair of rollers disposed opposite each other with the curved inversion route T therebetween. When placed on the feeder tray 15, a medium is fed into the scanner 1 by a pick roller 20, which is disposed so as to face the +Y side of the second surface of the medium.

The pick roller 20 is rotated by a feed motor 55 (see FIG. 3) and supported by a roller support member 21, which is disposed coaxially with a feed roller 24 (described later). When the roller support member 21 rotates, the pick roller 20 moves toward or away from the medium. The separation roller pair 23 is disposed downstream of the pick roller 20. The separation roller pair 23 includes: the feed roller 24 rotated by the feed motor 55 (see FIG. 3); and a separation roller pair 25 having rotational resistance given by a torque limiter (not illustrated). When the pick roller 20 feeds media, the separation roller pair 25 separates the media from one another, thereby feeding the media one by one in the downstream direction.

A first transport roller pair 27 is disposed downstream of the separation roller pair 23. The first transport roller pair 27 includes: a drive roller 28 rotated by a transport motor 56 (see FIG. 3); and a driven roller 29 that rotates together with the drive roller 28. When having passed through the first transport roller pair 27, a medium is curved downward. A second transport roller pair 31 is disposed downstream of the first transport roller pair 27. The second transport roller pair 31 nips the medium that has been curved downward and then inverted along the curved inversion route T at the location downstream of the portion of the curved inversion route T closest to the +Y side. Then, the second transport roller pair 31 feeds the medium in the downward direction. The second transport roller pair 31 includes: a drive roller 32 rotated by the transport motor 56 (see FIG. 3); and a driven roller 33 that rotates together with the drive roller 32.

After having been fed in the +Y direction from the feeder tray 15, a medium is curved downward along the curved inversion route T, then inverted, and transported in the opposite direction, or in the −Y direction. After that, the medium passes through the area opposite the first reader 4 being stationary at the location in FIG. 2, then the first surface thereof is read by the first reader 4, and reaches a third transport roller pair 35. The third transport roller pair 35 includes: a drive roller 36 rotated by the transport motor 56 (see FIG. 3); and a driven roller 37 that rotates together with the drive roller 36.

After having been fed by the third transport roller pair 35, the medium passes through the area opposite the second reader 45, then the second surface thereof is read by the second reader 45, and reaches the fourth transport roller pair 39. The fourth transport roller pair 39 includes: a drive roller 40 rotated by the transport motor 56 (see FIG. 3); and a driven roller 41 that rotates together with the drive roller 40. After that, the medium is ejected to the ejection tray 47 by the fourth transport roller pair 39.

While a medium is being transported along the curved inversion route T configured above, the first surface of a medium which has been oriented upward on the feeder tray 15 is read by the first reader 4, and then the second surface of the medium which has been oriented downward on the feeder tray 15 is read by the second reader 45. In one embodiment, each of the first reader 4 and the second reader 45 may be a contact image sensor module (CISM).

Figure 3:
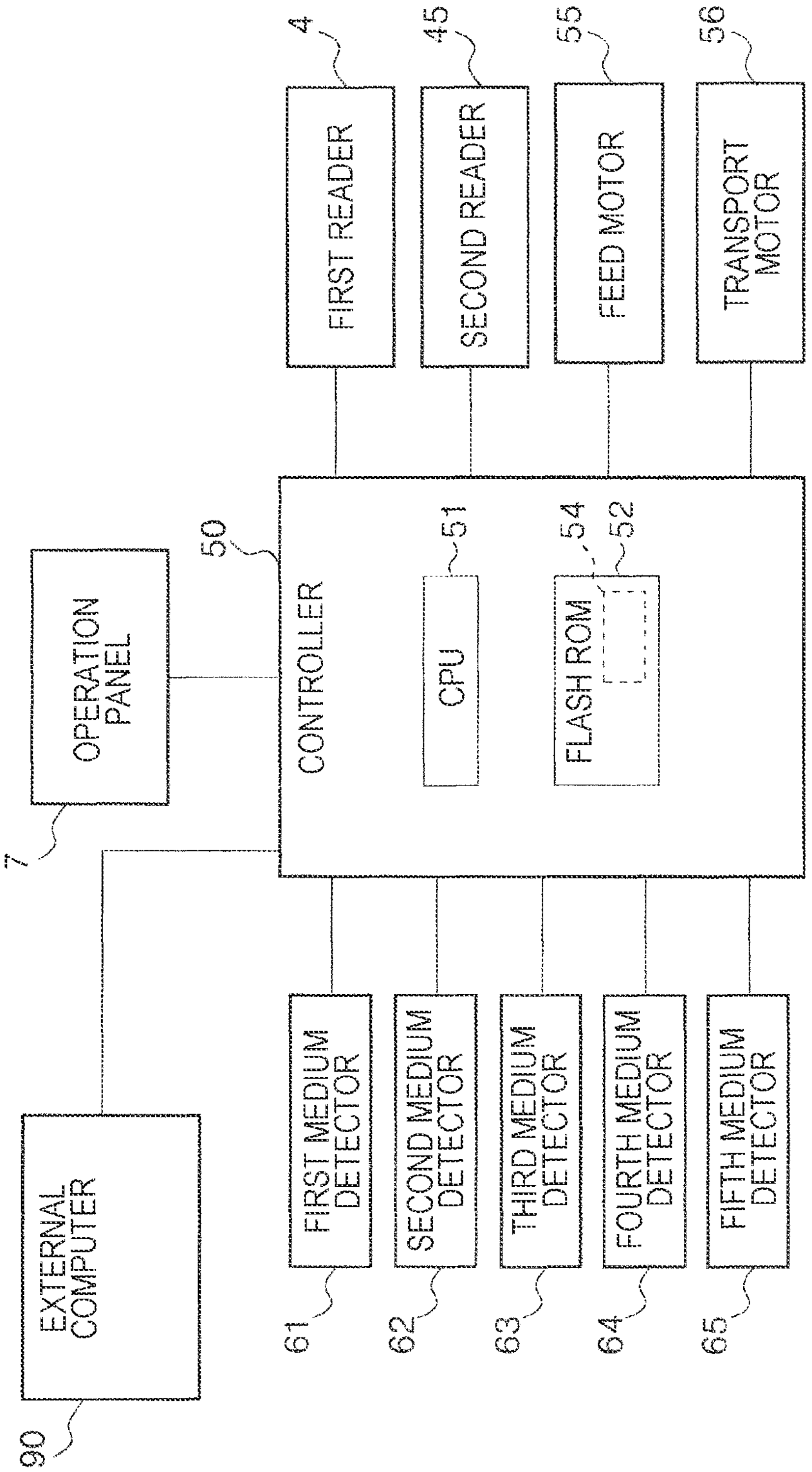
FIG. 3 is a block diagram of the control system in the medium transport apparatus.

With reference to FIG. 3, a control system in the scanner 1 will be described below. A controller 50 in the control system controls various operations of the scanner 1, such as feeding, transporting, ejecting, and reading of a medium P. The controller 50 also receives a signal from an operation panel 7. In one embodiment, the controller 50 is disposed inside the scanner unit 2; however, the controller 50 may be disposed inside the medium transport apparatus 10.

The controller 50 includes a central processing unit (CPU) 51 and flash read-only memory (ROM) 52, which is non-volatile memory from or in which data is readable/writable. To control the operations of the scanner 1, the CPU 51 performs various calculating processes in accordance with programs 54 and parameters stored in the flash ROM 52. The programs 54 may include a jam detection program that causes the scanner 1 to perform a jam detection process (described later) and other programs that cause the scanner 1 to feed, transport, and read a medium. The jam detection program is used to realize a jam detection method, which will be described later with reference to FIG. 10.

The scanner 1 is connectable to an external computer 90, which transmits information to the controller 50. The external computer 90 includes a display unit (not illustrated) that realizes a user interface (UI) in accordance with a control program stored in internal memory (not illustrated). The controller 50 receives read data from the first reader 4 and the second reader 45 and transmits control signals to the first reader 4 and the second reader 45.

The controller 50 controls the feed motor 55 and the transport motor 56, each of which may be a direct current (DC) motor in one embodiment. The feed motor 55 and the transport motor 56 have rotary encoders (not illustrated) that transmit pulse signals to the controller 50 to inform their rotational frequencies and speeds, thereby enabling the controller 50 to keep track of the operational state of each roller pair.

The controller 50 varies a voltage applied to each of the feed motor 55 and the transport motor 56 in accordance with a pulse width modulation (PWM) scheme. More specifically, the controller 50 receives a pulse signal having a predetermined switching period and then applies a voltage, namely, supplies a current to each of the feed motor 55 and the transport motor 56 only during the ON period of the pulse signal. Herein, the ratio of the ON period to the switching period is defined as a duty value. The controller 50 controls the rotational speed of each of the feed motor 55 and the transport motor 56 by adjusting the duty value in accordance with a target speed curve having an accelerating, constant-speed, and decelerating zones.

The controller 50 performs proportional integral differential (PID) control in such a way that a current rotational speed of the motor disposed at each location converges to a target one. In this case, the duty value increases as the difference between the target and current rotational speeds increases, whereas the duty value decreases as the difference decreases. More specifically, when a drive load on a motor increases to cause the difference between the target and current rotational speeds to increase, the duty value, which is an example of the motor drive load, also increases. When the motor drive load decreases to cause the difference between the target and current rotational speeds to decrease, the duty value also decreases. In short, the duty value may be a variable depending on the drive load on the motor.

When a medium jam occurs at a predetermined location on the curved inversion route T, the duty value for the transport motor 56 increases. The controller 50 refers to the duty value for the transport motor 56 and a threshold during the transport of a medium. When the duty value for the transport motor 56 exceeds the threshold, the controller 50 performs the jam detection process to determine whether a medium jam occurs. Hereinafter, the threshold is referred to as the jam detection threshold. When determining that a medium jam occurs, the controller 50 stops driving both the feed motor 55 and the transport motor 56 and displays a warning message reading "medium jam has occurred" in the operation panel 7.

In one embodiment, the controller 50 performs the jam detection process, based on the duty value for the transport motor 56. This means that the controller 50 cannot determine whether a medium jam occurs until the upstream side of a medium has reached the first transport roller pair 27. However, even before the upstream side of a medium reaches the first transport roller pair 27, if the separation roller pair 23 feeds the medium by a predetermined amount but a second medium detector 62 (described later) does not detect the upstream side of the medium, the controller 50 may determine that a medium jam occurs. Furthermore, even after the upstream side of the medium has reached the first transport roller pair 27, if one or more of the separation roller pair 23 and the first transport roller pair 27 to the fourth transport roller pair 39 feed the medium by a predetermined amount but none of a third medium detector 63, a fourth medium detector 64, and a fifth medium detector 65 (described later) detects the upstream side of the medium, the controller 50 may determine that a medium jam occurs. These processes may be performed together with the above jam detection process.

The controller 50 receives detection signals from a first medium detector 61, the second medium detector 62, the third medium detector 63, the fourth medium detector 64, and the fifth medium detector 65. Each of the first medium detector 61 to the fifth medium detector 65, which may be an optical sensor that includes an optical transmitter (not illustrated) and an optical receiver (not illustrated), transmits a detection signal to the controller 50 which informs that the upstream or downstream side of a medium has passed through its detection area. Alternatively, each of the first medium detector 61 to the fifth medium detector 65 may be a contact sensor that detects the presence of a medium by coming into contact with the medium.

Figure 4:
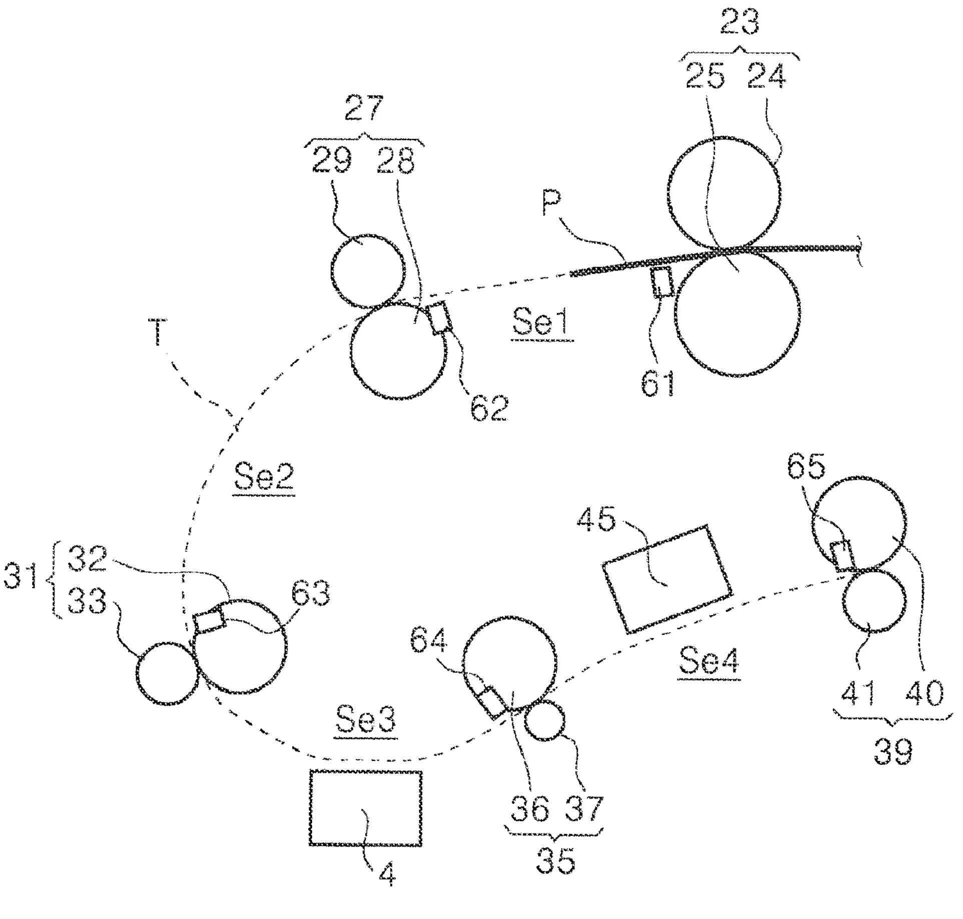
FIG. 4 illustrates a first example in which a medium is being transported along the medium transport route.
Figure 5:
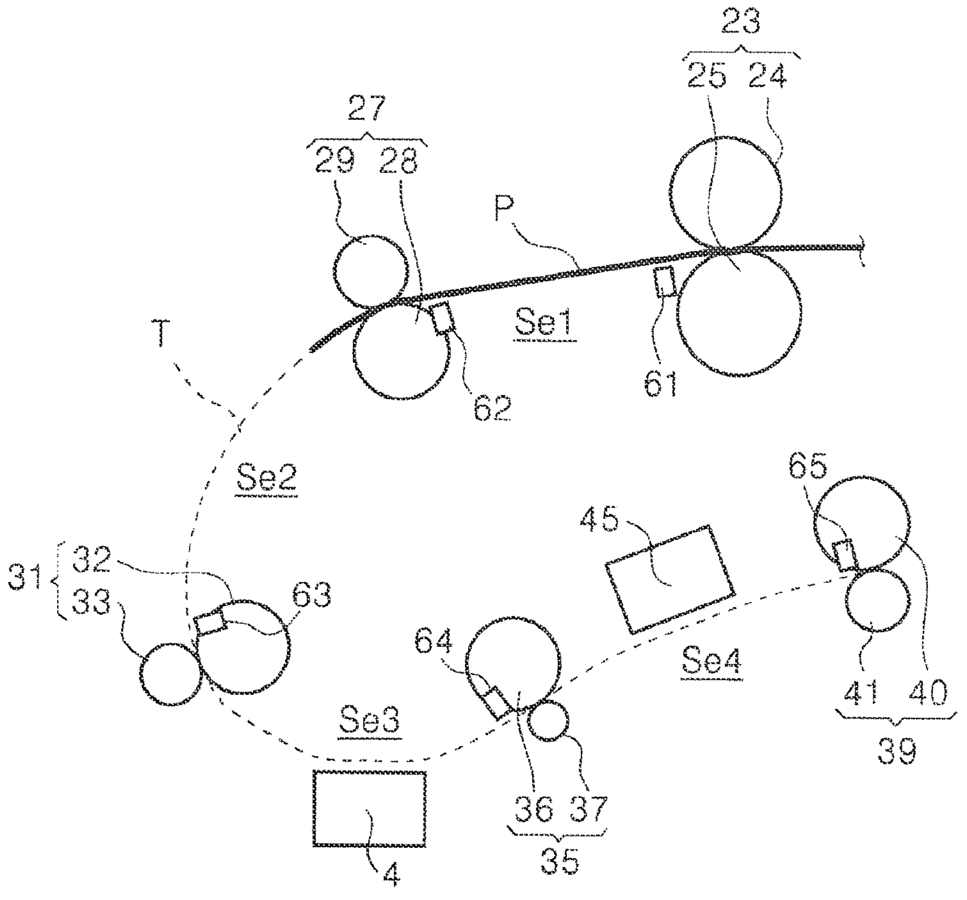
FIG. 5 illustrates a second example in which the medium is being transported along the medium transport route.

As illustrated in FIG. 4, the first medium detector 61 is disposed in relation to the separation roller pair 23; the second medium detector 62 is disposed in relation to the first transport roller pair 27; the third medium detector 63 is disposed in relation to the second transport roller pair 31; the fourth medium detector 64 is disposed in relation to the third transport roller pair 35; and the fifth medium detector 65 is disposed in relation to the fourth transport roller pair 39. Based on the detection signals from the first medium detector 61 to the fifth medium detector 65, the controller 50 can keep track of current locations of the upstream and downstream sides of a medium.

In one embodiment, the first medium detector 61 detects a medium close to and downstream of the nip location of the separation roller pair 23. Likewise, the second medium detector 62 detects a medium close to and upstream of the nip location of the first transport roller pair 27; the third medium detector 63 detects a medium close to and upstream of the nip location of the second transport roller pair 31; the fourth medium detector 64 detects a medium close to and upstream of the nip location of the third transport roller pair 35; and the fifth medium detector 65 detects a medium close to and upstream of the nip location of the fourth transport roller pair 39.

Next, a description will be given below of how to vary the jam detection threshold during the above jam detection process. In one embodiment, the controller 50 varies the jam detection threshold, depending on how many transport roller pairs are transporting a medium, whether the medium is nipped in the separation roller pair 23, and where the upstream side of the medium is positioned on the curved inversion route T, for example. In addition to varying the jam detection threshold, the controller 50 varies the rotational speed of the feed motor 55 and the transport motor 56, namely, a target transport speed of a medium. FIGS. 4 to 8 illustrate examples of the state where an A4-sized medium P being transported with both short sides lined up at the ±X side is positioned at different locations. In FIGS. 4 to 8, reference Se1 denotes the zone on the curved inversion route T between the separation roller pair 23 and the first transport roller pair 27; reference Se2 refers to the zone on the curved inversion route T between the first transport roller pair 27 and the second transport roller pair 31; reference Se3 denotes the zone on the curved inversion route T between the second transport roller pair 31 and the third transport roller pair 35; and reference Se4 denotes the zone on the curved inversion route T between the third transport roller pair 35 and the fourth transport roller pair 39.

In the example of FIG. 4, since the medium P is nipped only in the separation roller pair 23, a drive load involved in the transport of the medium P is placed on the feed motor 55, but no drive load is placed on the transport motor 56. Then, when further transported, the medium P becomes nipped in the first transport roller pair 27, as in the example of FIG. 5. In this case, a drive load generated in one transport roller pair is placed on the transport motor 56.

Figure 6:
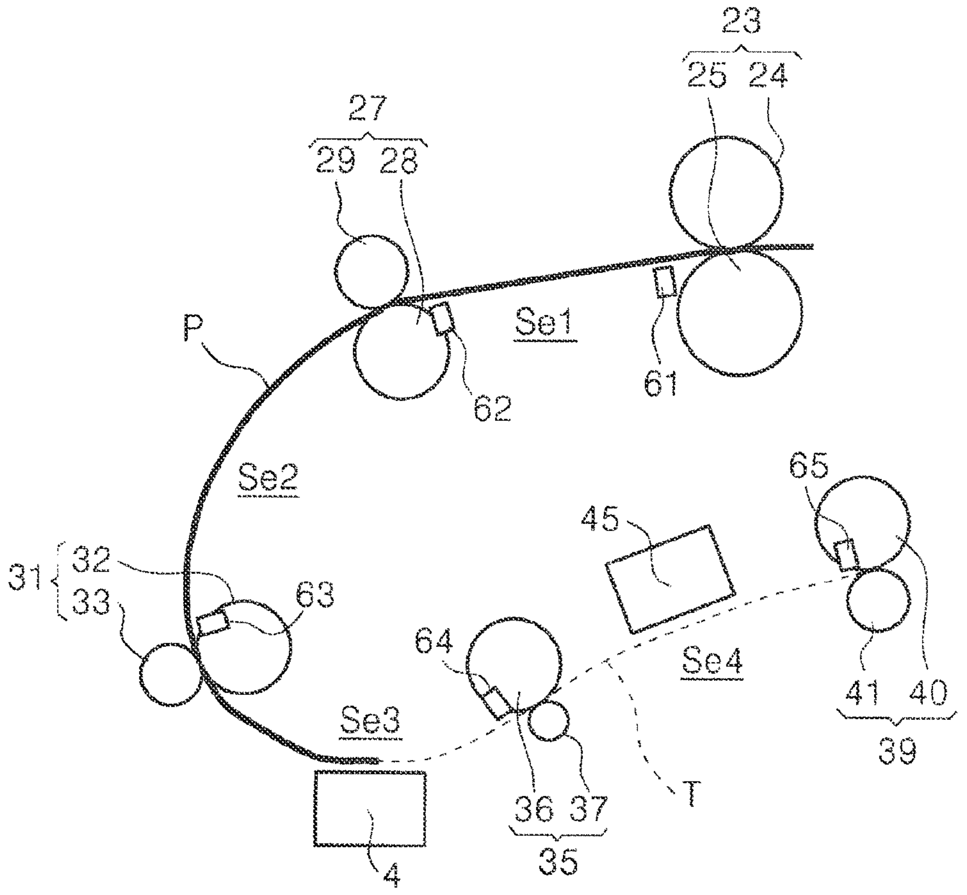
FIG. 6 illustrates a third example in which the medium is being transported along the medium transport route.
Figure 7:
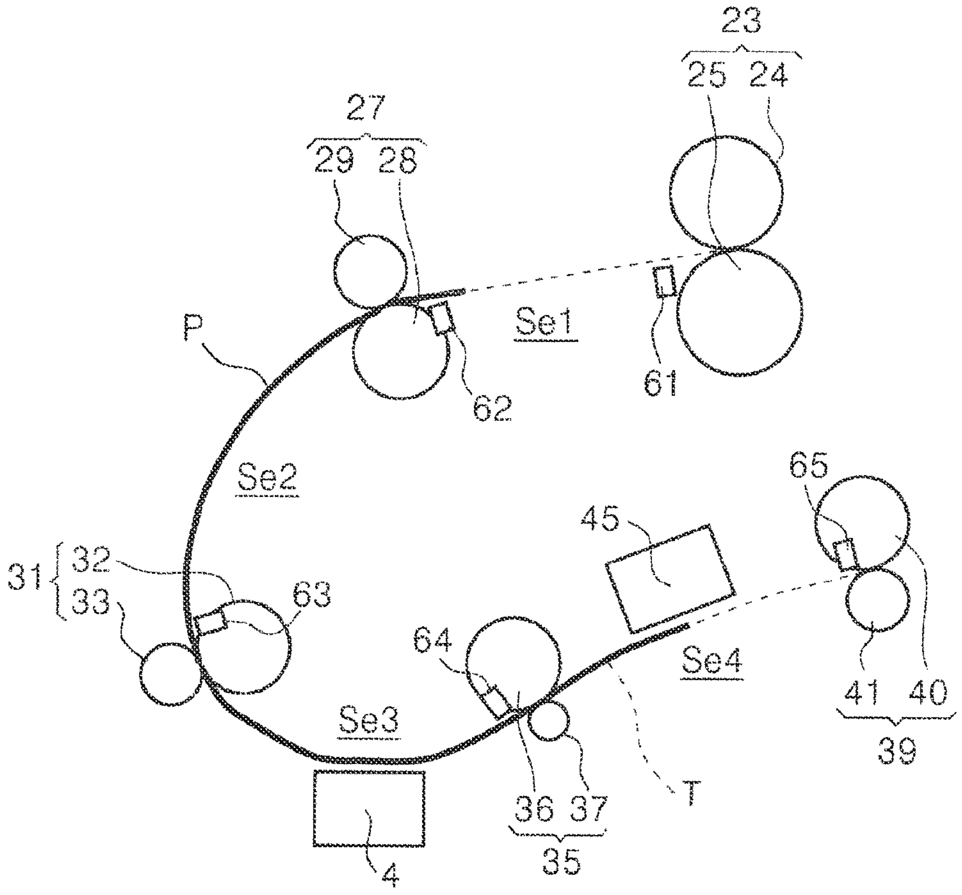
FIG. 7 illustrates a fourth example in which the medium is being transported along the medium transport route.
Figure 8:
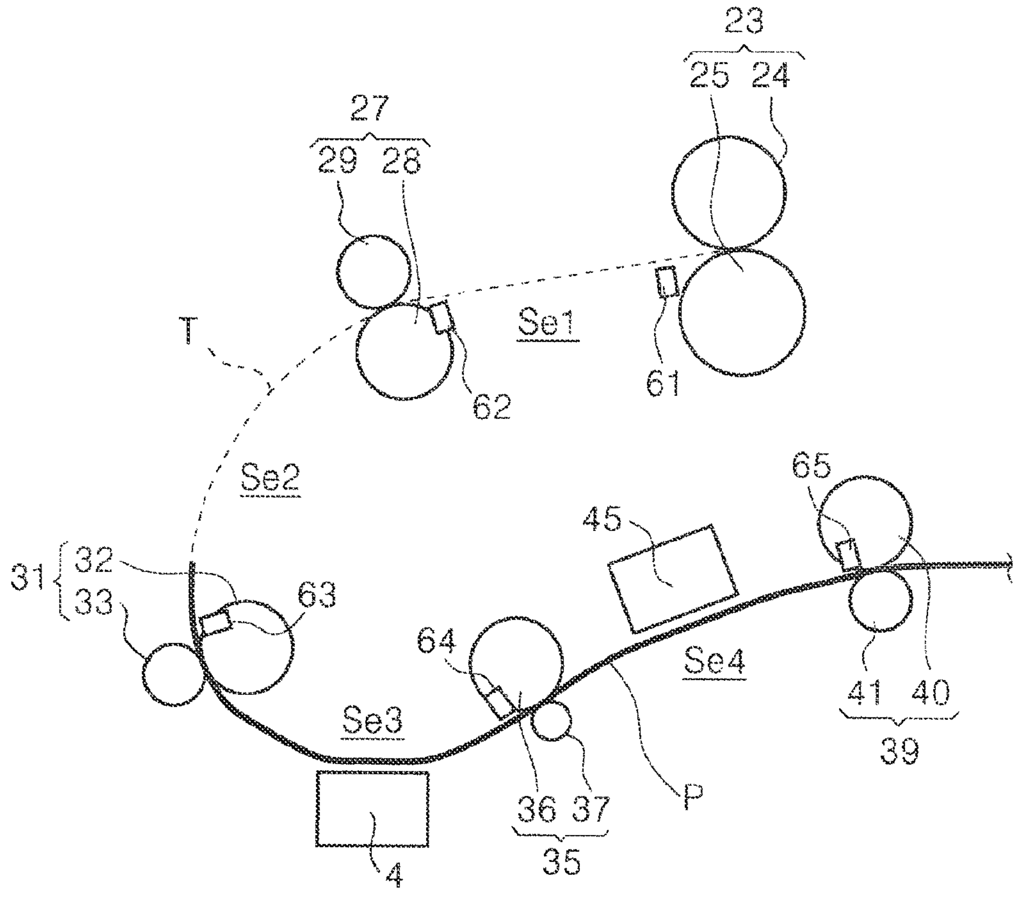
FIG. 8 illustrates a fifth example in which the medium is being transported along the medium transport route.

When further transported, the medium P becomes nipped in the first transport roller pair 27 and the second transport roller pair 31, as in the example of FIG. 6. In this case, a drive load generated in two transport roller pairs is placed on the transport motor 56. Then, when further transported, the medium P becomes nipped in the first transport roller pair 27, the second transport roller pair 31, and the third transport roller pair 35, as in the example of FIG. 7. In this case, a drive load generated in three transport roller pairs is placed on the transport motor 56. Then, when further transported, the medium P becomes nipped in the second transport roller pair 31, the third transport roller pair 35, and the fourth transport roller pair 39, as in the example of FIG. 8. In this case, a drive load generated in three transport roller pairs is placed on the transport motor 56. Although the following examples are not illustrated, when the medium P is further transported, a drive load generated in two roller pairs is placed on the transport motor 56. Then, a drive load generated in one roller pair (fourth transport roller pair 39) is placed on the transport motor 56. After the medium P has been ejected to ejection tray 47, the drive load involved in the transport of the medium P is no longer placed on the transport motor 56. It should be noted that if the medium P has a longer length, a drive load generated in four transport roller pairs may be placed on the transport motor 56.

Figure 9:
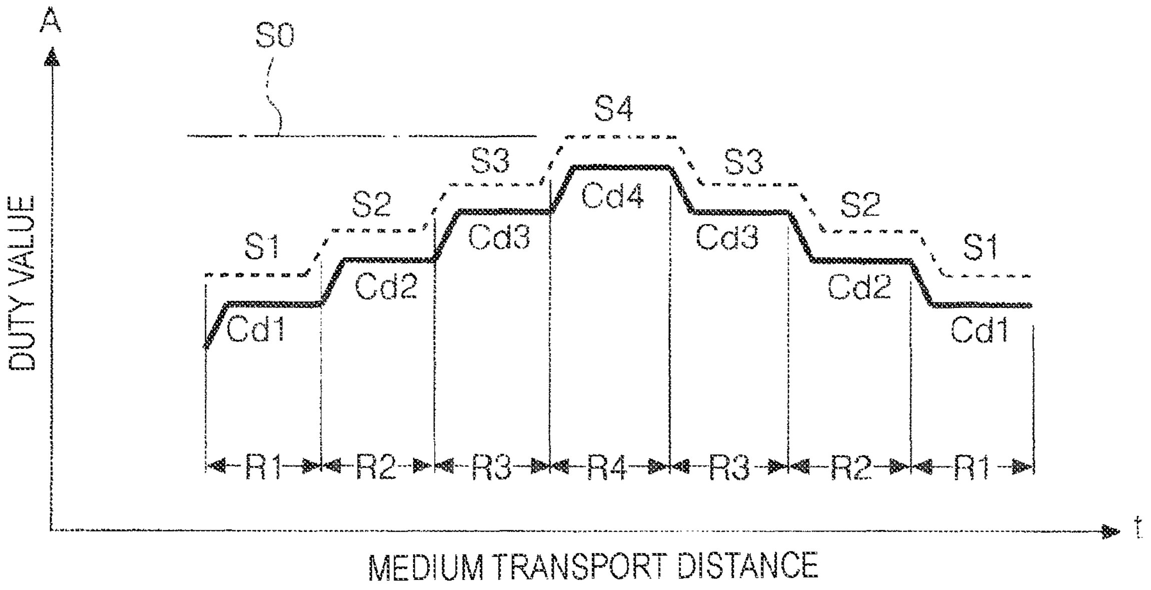
FIG. 9 is a graph indicating the relationship of a medium transport distance, a duty value for the motor, and a threshold.

As described above, the medium P is transported along the curved inversion route T by a varying number of transport roller pairs. In short, while the medium P is being transported along the curved inversion route T, the duty value for the transport motor 56 varies. FIG. 9 is a graph in which the horizontal axis t represents a medium transport distance, and the vertical axis A represents the duty value for the transport motor 56. The horizontal axis t has zones R1, R2, R3, and R4. In each zone R1, out of the first transport roller pair 27 to the fourth transport roller pair 39 rotated by the transport motor 56, one transport roller pair transports the medium P. In each zone R2, two transport roller pairs transport the medium P. In each zone R3, three roller pairs transport the medium P. In the zone R4, four roller pairs transport the medium P. Moreover, the solid lines Cd1 each denote the duty value for the transport motor 56 within the zone R1; the solid lines Cd2 each denote the duty value for the transport motor 56 within the zone R2; the solid lines Cd3 each denote the duty value for the transport motor 56 within the zone R3; and the solid line Cd4 denotes the duty value for the transport motor 56 within the zone R4. As can be seen from this graph, the duty value for the transport motor 56 first increases and then decreases in a stepwise manner as the transport distance of the medium P increases.

In the above configuration, if the jam detection threshold is fixed to the maximum value, or the duty value Cd4 indicated by an alternate long and short dash line S0, each of the duty values Cd1, Cd2, and Cd3 greatly differs from the jam detection threshold S0. Thus, if a medium jam occurs when the transport distance of the medium P is within the zone R1, R2, or R3, it may take a long time for the duty value to exceed the jam detection threshold S0 might increase, thereby risking worsening the medium jam to seriously damage the medium P and the transport mechanism.

To reduce the above risk, the controller 50 varies the jam detection threshold, depending on how many transport roller pairs are transporting a medium P. Based on detection signals from the first medium detector 61, the second medium detector 62, the third medium detector 63, and the fourth medium detector 64, the controller 50 determines how many transport roller pairs are transporting the medium P. As a larger number of detectors detect the medium P, namely, as a larger number of transport roller pairs are transporting the medium P, the controller 50 sets the jam detection threshold to a larger value, as illustrated in FIG. 9. As a smaller number of detectors detect the medium P, namely, as a smaller number of transport roller pairs are transporting the medium P, the controller 50 sets the jam detection threshold to a lower value.

In FIG. 9, the broken lines S1 each indicate a jam detection threshold for the zone R1; the broken lines S2 each indicate a jam detection threshold for the zone R2; the broken lines S3 each indicate a jam detection threshold for the zone R3; and the broken line S4 indicates a jam detection threshold for the zone R4. Each of these jam detection thresholds may be a value obtained by adding a predetermined margin to a duty value experimentally determined in advance and may be stored in the flash ROM 52 (see FIG. 3) and read therefrom as necessary.

Figure 10:
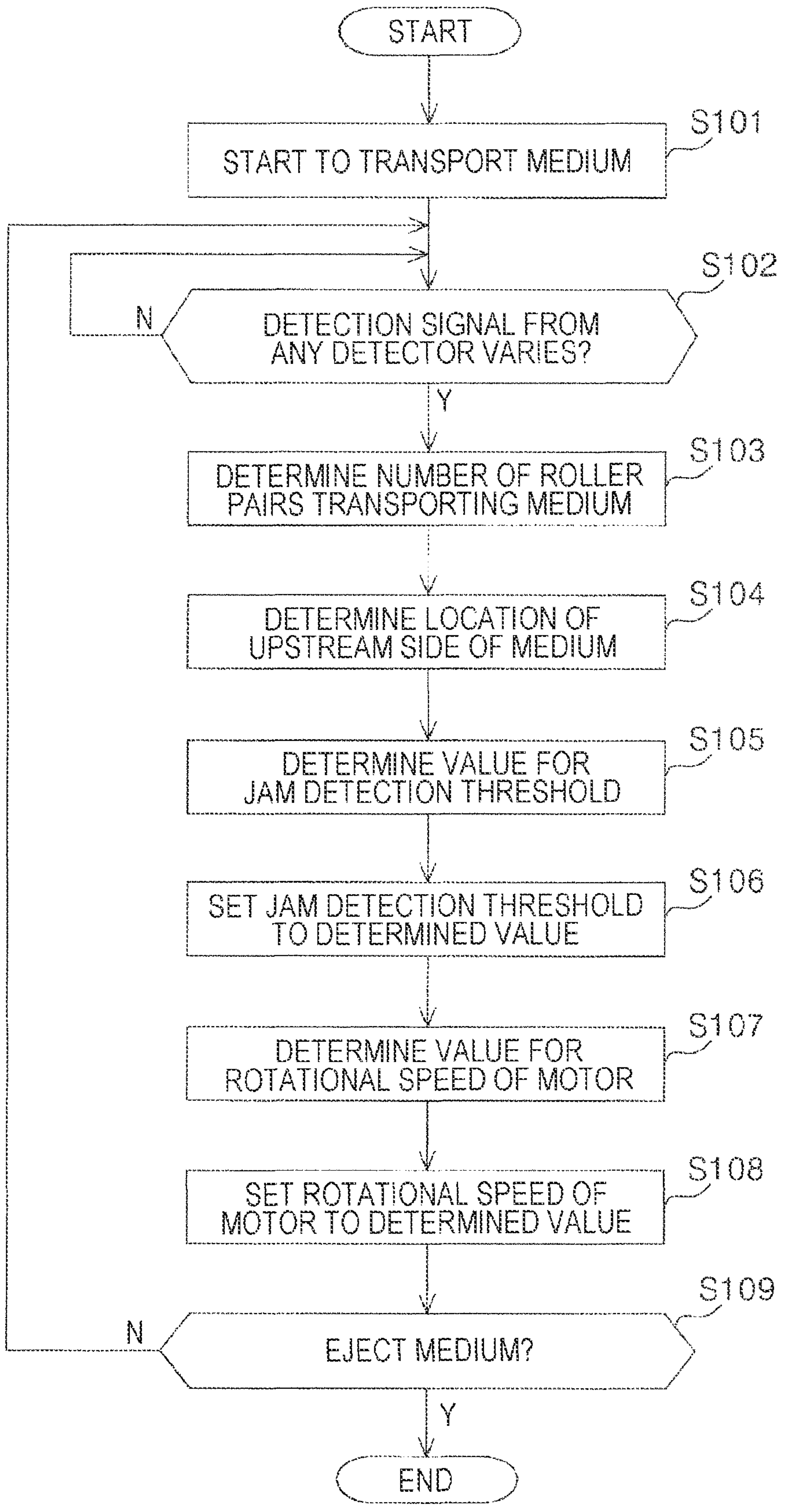
FIG. 10 is a flowchart of a jam detection process according to an embodiment of the present disclosure.

With reference to FIG. 10, a description will be given below of a process to be performed by the controller 50 in accordance with a jam detection program. At Step S101, the controller 50 starts to transport a medium P. At Step S102, the controller 50 continuously monitors variations in detection signals from any of the second medium detector 62, the third medium detector 63, the fourth medium detector 64, and the fifth medium detector 65. When any of the detection signals varies (Yes at Step S102), at Step S103, the controller 50 determines how many transport roller pairs are transporting the medium P.

At Step S104, the controller 50 determines in which of zones Se1, Se2, Se3, and Se4 on the curved inversion route T the upstream side of the medium P is positioned. At Step S105, the controller 50 determines a value for the jam detection threshold, based on the results determined at Steps S103 and S104. How to determine a value for the jam detection threshold at Step S105 will be described later in detail. At Step S106, the controller 50 sets the jam detection threshold to the value determined at Step S105.

At Step S107, the controller 50 determines a value for the rotational speed of the feed motor 55 and the transport motor 56, based on the results determined at Steps S103 and S104. At Step S108, the controller 50 sets the rotational speed of the feed motor 55 and the transport motor 56 to the value determined at Step S107. How to determine a value for the motor rotational speeds will be described later in detail. At Step S109, the controller 50 performs the above steps until the medium P has been ejected, namely, until the downstream side of the medium P has passed through the fourth medium detector 64.

Table 1 indicates the relationship of the number of transport roller pairs transporting the medium P, the jam detection threshold, and the motor rotational speed.

TABLE 1

| NUMBER OF ROLLER PAIRS TRANSPORTING MEDIUM | JAM DETECTION THRESHOLD | MOTOR DRIVE SPEED |
|---|---|---|
| 1 | S1 | V1 |
| 2 | S2 | V2 |
| 3 | S3 | V3 |
| 4 | S4 | V4 |

In Table 1, the jam detection thresholds S1, S2, S3, and S4, which are determined in the above manner and with reference to the graph of FIG. 9, increase in this order. Among the motor rotational speeds V1, V2, V3, and V4, the motor rotational speed V1 is the maximum value, and the motor rotational speed V4 is the minimum value. More specifically, the motor rotational speeds V1, V2, V3, and V4 decrease in this order. The motor rotational speeds V1, V2, V3, and V4 may be stored in the flash ROM 52 (see FIG. 3) and read therefrom as necessary.

To set the jam detection threshold to a larger value, the controller 50 gradually increases the jam detection threshold in response to the detection of a varying signal from any detector, as illustrated in FIG. 9. Likewise, to set the jam detection threshold to a lower value, the controller 50 gradually decreases the jam detection threshold in response to the detection of a varying signal from any detector, as illustrated in FIG. 9, namely, in response to a varying number of transport roller pairs transporting the medium P. In short, the controller 50 sets the jam detection threshold so as to follow a varying duty value of the transport motor 56. Alternatively, the controller 50 may vary the jam detection threshold in a perfectly stepwise manner.

In a jam detection process, as described above, the controller 50 determines how many detectors are detecting a medium P, namely, how many transport roller pairs are transporting the medium P, based on detection information from a plurality of detectors. Then, the controller 50 sets a jam detection threshold to a larger value as a larger number of transport roller pairs are transporting the medium P and sets the jam detection threshold to a lower value as a smaller number of transport roller pairs are transporting the medium P. The controller 50 contains a jam detection program to perform the jam detection process. This jam detection program is used to implement the above jam detection method. In this way, even when a small number of transport roller pairs transport a medium P, the duty value for the transport motor 56 does not greatly differ from the jam detection threshold, thereby detecting a medium jam in a short time. Consequently, it is possible to reduce the risk of a medium jam worsened and seriously damaging the medium and the transport mechanism.

Next, a description will be given below of how to vary the motor rotational speed of the feed motor 55 and the transport motor 56, depending on how many transport roller pairs are transporting a medium P. As a smaller number of transport roller pairs transport a medium P, the medium P is more likely to slip over those roller pairs and be fed by an insufficient amount. In this case, the first reader 4 and the second reader 45 may fail to clearly read the first and second surfaces of the medium P. For this reason, the controller 50 varies the rotational speed of the feed motor 55 and the transport motor 56, depending on how many transport roller pairs are transporting the medium P. More specifically, as a larger number of transport roller pairs are transporting the medium P, the controller 50 sets the rotational speed of the transport motor 56 to a lower value. As a smaller number of transport roller pairs are transporting the medium P, the controller 50 sets the rotational speed of the transport motor 56 to a larger value. In this case, at least until the downstream side of the medium P has passed through the first medium detector 61, the controller 50 may cause the rotational speed of the feed motor 55 for driving the separation roller pair 23, namely, a target speed of the separation roller pair 23 to vary at substantially the same rate as a varying rate of the transport motor 56. In this way, it is possible to feed a medium P by an appropriate amount, regardless of how many transport roller pairs are transporting the medium P, thereby enabling the first reader 4 and the second reader 45 to clearly read the first and second surfaces of the medium P.

As described above, the controller 50 varies a jam detection threshold and a motor rotational speed, depending on how many transport roller pairs are transporting a medium P. In one embodiment, however, the controller 50 may also vary a jam detection threshold (Step S105 in FIG. 10) and a motor rotational speed (Step S107 in FIG. 10), based on some other factors. Details of these configurations will be described below.

The controller 50 may vary a jam detection threshold, depending on where a medium P is positioned on the curved inversion route T, thereby successfully setting a jam detection threshold to a proper value and detecting a medium jam precisely. Details of such configurations will be described below. When a medium P is nipped in the separation roller pair 23, a transport load is placed on one or more transport roller pairs disposed downstream of the separation roller pair 23, thereby increasing a duty value for the transport motor 56. Thus, if the controller 50 uniquely sets a jam detection threshold that has been determined when the medium P is nipped in the separation roller pair 23, the duty value for the transport motor 56 may greatly differ from the jam detection threshold when the medium P is not nipped in the separation roller pair 23. In such cases, it might take a long time to detect a medium jam.

To avoid the above disadvantage, the controller 50 sets the jam detection threshold in such a way that the jam detection threshold when the medium P is not nipped in the separation roller pair 23 is lower than the jam detection threshold when the medium P is nipped in the separation roller pair 23. Table 2 lists an example of coefficients to be multiplied by a jam detection threshold and a motor rotational speed when a medium P is nipped in the separation roller pair 23 and when a medium P is not nipped in the separation roller pair 23.

TABLE 2

| SEPARATION ROLLER PAIR | THRESHOLD MULTIPLIER | SPEED MULTIPLIER |
|---|---|---|
| NIPPING | Ma1 | Na1 |
| NOT NIPPING | Ma2 | Na2 |

In Table 2, the threshold multipliers Ma1 and Ma2 (Ma1>Ma2) are to be multiplied by a corresponding jam detection threshold in Table 1. The threshold multipliers Ma1 and Ma2 may be stored in the flash ROM 52 (see FIG. 3) and read therefrom as necessary. In this way, it is possible to suppress the duty value for the transport motor 56 from greatly differing from the jam detection threshold when a medium P is not nipped in the separation roller pair 23, thereby detecting a jam medium in a short time.

In the above configuration, the separation roller pair 23 optionally nips a medium P at a force depending on the type of the medium P. Moreover, the controller 50 optionally switches a plurality of threshold multipliers and speed multipliers as in Table 2 in accordance with the force at which the separation roller pair 23 nips the medium P.

The controller 50 may also vary the rotational speed of the transport motor 56, depending on whether a medium P is nipped in the separation roller pair 23. A reason for this is that, when nipped in the separation roller pair 23, the medium P may slip over one or more transport roller pairs disposed downstream of the separation roller pair 23 and be fed by an insufficient amount. In this case, the first reader 4 and the second reader 45 might fail to clearly read the first and second surfaces of the medium P. Therefore, when the medium P is nipped in the separation roller pair 23, the controller 50 sets the rotational speed of the transport motor 56 in such a way that the rotational speed when the medium P is nipped in the separation roller pair 23 is higher than the rotational speed when the medium P is not nipped in the separation roller pair 23.

In Table 2, the speed multipliers Na1 and Na2 (Na1>Na2) are to be multiplied by a corresponding motor rotational speed in Table 1. The speed multipliers Na1 and Na2 may be stored in the flash ROM 52 (see FIG. 3) and read therefrom as necessary. In this way, the controller 50 feeds the medium P by an appropriate amount, regardless of whether the medium P is nipped in the separation roller pair 23, thereby enabling the first reader 4 and the second reader 45 to clearly read the first and second surfaces of the medium P. In this case, at least until the downstream side of the medium P has passed through the first medium detector 61, the controller 50 may cause the rotational speed of the feed motor 55 for driving the separation roller pair 23, namely, a target speed of the separation roller pair 23 to vary at substantially the same rate as a varying rate of the transport motor 56.

The duty value for the transport motor 56 increases in proportion to the curvature of the curved inversion route T along which the upstream side of a medium P is to be moved. While the medium P is being transported, the upstream side and second surface of the medium P is kept in contact with a guide surface (not illustrated) of the curved inversion route T. Therefore, a heaver drive load is placed on the transport motor 56 as the curvature of the curved inversion route T increases. Nevertheless, if the controller 50 uniquely sets a jam detection threshold that has been determined when the upstream side of the medium P is positioned on a portion of a route which has a greater curvature, the duty value for the transport motor 56 may greatly differ from the jam detection threshold when the medium P is positioned on a portion of the route which has a smaller curvature. In such cases, it might take a long time to detect a medium jam.

To avoid the above disadvantage, when a medium P is transported along a route having a first zone and a second zone, the curvature of the first zone being smaller than the curvature of the second zone, the controller 50 varies the jam detection threshold in such a way that the jam detection threshold when the upstream side of the medium P is positioned within the first zone of the curved inversion route T is lower than the jam detection threshold when the upstream side of the medium P is positioned within the second zone of the curved inversion route T. Thus, when the upstream side of the medium P is positioned within the second zone, the controller 50 sets the jam detection threshold that is larger than that when the upstream side of the medium P is positioned within the first zone. In one embodiment, each of the zones Se1 and Se4 may correspond to the first zone, and each of the zones Se2 and Se3 may correspond to the second zone. Table 3 lists an example of the relationship of the location of the upstream side of a medium, a threshold multiplier, and a speed multiplier.

TABLE 3

| LOCATION OF UPSTREAM SIDE OF MEDIUM | THRESHOLD MULTIPLIER | SPEED MULTIPLIER |
|---|---|---|
| ZONE Se2 | Mb1 | Nb1 |
| ZONE Se3 | Mb2 | Nb2 |
| ZONE S5e4 | Mb3 | Nb3 |
| ZONE DOWNSTREAM OF ZONE Se4 | Mb4 | Nb4 |

In Table 3, the threshold multipliers Mb1, Mb2, Mb3, and Mb4 (Mb4<Mb3<Mb2=Mb1) are to be multiplied by a corresponding jam detection threshold in Table 1. The threshold multipliers Mb1, Mb2, Mb3, and Mb4 may be stored in the flash ROM 52 (see FIG. 3) and read therefrom as necessary. In this way, even when the upstream side of a medium P is moved along a route having a decreased curvature, it is possible to suppress the duty value for the transport motor 56 from greatly differing from the jam detection threshold, thereby successfully detecting a medium jam in a short time.

When a medium jam is more likely to occur in the zone Se3, namely, a zone in which the first reader 4 reads the medium P than in the zone Se2, the controller 50 optionally sets the jam detection threshold for the zone Se3 so as not to greatly differ from the duty value that has been determined when no medium jam occurs, thereby successfully detecting a medium jam in a further short time.

In Table 3, the speed multipliers Nb1, Nb2, Nb3, and Nb4 (Nb4<Nb3<Nb2=Nb1) are to be multiplied by a corresponding motor rotational speed in Table 1. The speed multipliers Nb1, Nb2, Nb3, and Nb4 may be stored in the flash ROM 52 (see FIG. 3) and read therefrom as appropriate. In this way, the controller 50 feeds a medium P by an amount suitable for the location of the upstream side of the medium P on the curved inversion route T, thereby enabling the first reader 4 and the second reader 45 to clearly read the first and second surfaces of the medium P. In this case, at least until the downstream side of the medium P has passed through the first medium detector 61, the controller 50 may cause the rotational speed of the feed motor 55 for driving the separation roller pair 23, namely, a target speed of the separation roller pair 23 to vary at substantially the same rate as a varying rate of the transport motor 56.

The controller 50 may also vary the jam detection threshold for and the rotational speed of the transport motor 56, depending on the rigidity of a medium P. When transporting a first medium and a second medium along the curved inversion route T, the rigidity of the first medium is lower than the rigidity of the second medium, the controller 50 sets the jam detection threshold in such a way that the jam detection threshold during the transport of the first medium is lower than the jam detection threshold during transport of the second medium. Thus, during the transport of the second medium, the controller 50 sets the jam detection threshold to a lower value than that during the transport of the first medium.

As the rigidity of the medium P increases, the duty value of the transport motor 56 also increases. Thus, if the controller 50 uniquely sets a jam detection threshold that has been determined when a medium P has higher rigidity, the duty value for the transport motor 56 may greatly differ from the jam detection threshold during the transport of a medium P having lower rigidity. In such cases, it might take a long time to detect a medium jam.

To avoid the above disadvantage, when transporting a first medium and a second medium along the curved inversion route T, the rigidity of the first medium being lower than the rigidity of the second medium, the controller 50 sets the jam detection threshold in such a way that the jam detection threshold during the transport of the first medium is lower than the jam detection threshold during the transport of the second medium. Table 4 lists an example of the relationship of the type of a medium, a threshold multiplier, and a speed multiplier.

TABLE 4

| TYPE OF MEDIUM | THRESHOLD MULTIPLIER | SPEED MULTIPLIER |
|---|---|---|
| MEDIUM 1 | Mc1 | Nc1 |
| MEDIUM 2 | Mc2 | Nc2 |
| MEDIUM 3 | Mc3 | Nc3 |
| MEDIUM 4 | Mc4 | Nc4 |

In Table 4, the rigidity of the medium 1 to the rigidity of the medium 4 increase in this order. Thus, the medium 4 has the highest rigidity among the media 1 to 4. The threshold multipliers Mc1, Mc2, Mc3, and Mc4 (Mc1<Mc2<Mc3<Mc4) are to be multiplied by a corresponding jam detection threshold in Table 1. The threshold multipliers Mc1, Mc2, Mc3, and Mc4 may be stored in the flash ROM 52 (see FIG. 3) and read therefrom as necessary. The type of medium may be entered by a user through the operation panel (see FIG. 3). Alternatively, the type of a medium may be recognized based on the duty value for the zone Se1 or Se2 on the curved inversion route T or based on detection information from a detector that detects the thickness of a medium P within the zone Se1.

When the media 1 and 2 are transported, the medium 1 corresponds to the above first medium, and the medium 2 corresponds to the above second medium. When the media 2 and 3 are transported, the medium 2 corresponds to the above first medium, and the medium 3 corresponds to the above second medium. When the media 3 and 4 are transported, the medium 3 corresponds to the above first medium, and the medium 4 corresponds to the above second medium. In this way, it is possible to suppress the duty value for the transport motor 56 from greatly differing from the jam detection threshold during the transport of a medium P having relatively low rigidity, thereby detecting a jam of the medium P in a short time.

In Table 4, the speed multipliers Nc1, Nc2, Nc3, and Nc4 (Nc1<Nc2<Nc3<Nc4) are to be multiplied by a corresponding motor rotational speed in Table 1. The threshold multiplier Nc1, Nc2, Nc3, and Nc4 may be stored in the flash ROM 52 (see FIG. 3) and read therefrom as necessary. As transport roller pairs transport a medium P having higher rigidity, a heavier load is placed on those transport roller pairs. Thus, the medium P is more likely to slip over those roller pairs and be fed by an insufficient amount. In this case, the first reader 4 and the second reader 45 may fail to clearly read the first and second surfaces of the medium P. However, when transporting a medium P having higher rigidity, the controller 50 sets the rotational speed of the transport motor 56 to a larger value, thereby suppressing the medium P from being fed by an insufficient amount. In this way, the controller 50 feeds a medium P by an amount suitable for the rigidity of the medium P, thereby enabling the first reader 4 and the second reader 45 to clearly read the first and second surfaces of the medium P. In this case, at least until the downstream side of the medium P has passed through the first medium detector 61, the controller 50 may cause the rotational speed of the feed motor 55 for driving the separation roller pair 23, namely, a target speed of the separation roller pair 23 to vary at substantially the same rate as a varying rate of the transport motor 56.

In the foregoing embodiment, a single medium P is present on the curved inversion route T, as illustrated in FIGS. 4 to 8. However, there are cases where a plurality of media P are present on the curved inversion route T. Even in such cases, the controller 50 can appropriately set a jam detection threshold and a motor rotational speed, depending on how many transport roller pairs are transporting each medium P.

In the foregoing embodiment, transport roller pairs are provided with respective detectors. In addition, the controller 50 keeps track of how many transport roller pairs are transporting a medium P, based on the detection signals from the detectors. Alternatively, the controller 50 may estimate a location of a medium P, based on the amount in which the medium P has been fed and then may continue to determine how many transport roller pairs are transporting a medium P, based on the estimated location. After that, the controller 50 may vary a jam detection threshold for and a rotational speed of the transport motor 56 in accordance with the number of transport roller pairs determined. In this case, not all the transport roller pairs may be provided with respective detectors that detect a medium P. Moreover, a detector does not necessarily have to detect a medium P at a location upstream of the nip location of a corresponding roller pair. Alternatively, the detector may detect a medium P at the nip location, downstream of the nip location, or any other location.

The present disclosure is not limited to the foregoing embodiment and may be modified in various ways within the scope of the inventions described in the claims. Those modifications obviously fall within the scope of the present disclosure. In the foregoing embodiment, the medium transport apparatus 10 is applied to the scanner 1, which is an example of an image read apparatus. However, the medium transport apparatus 10 may also be applied to recording apparatuses that record information on media.

What is claimed is:

1. A medium transport apparatus comprising:

a medium placement section on which a medium to be transported is placed;

a medium transport route along which the medium fed from the medium placement section is transported;

a plurality of transport roller pairs disposed on the medium transport route;

a motor that operates as a power source for the plurality of transport roller pairs; and a controller that controls the motor and is configured to perform a jam detection process to detect whether the medium jams on the medium transport route by referring to a drive load on the motor and a threshold related to the drive load, wherein the plurality of transport roller pairs are provided with respective detectors disposed on the medium transport route, the detectors being configured to detect the medium, the controller varies the threshold based on detection information from the detectors, the controller determines how many transport roller pairs are transporting the medium, based on the detection information from the detectors, and the controller sets the threshold to a larger value as a number of transport roller pairs that are transporting the medium increases and sets the threshold to a lower value as the number of transport roller pairs transporting the medium decreases.

2. The medium transport apparatus according to claim 1, wherein the controller varies the threshold, depending on where the medium is positioned on the medium transport route.

3. The medium transport apparatus according to claim 2, further comprising:

a separation roller pair that separates a plurality of media fed from the medium placement section, the separation roller pair being disposed on the medium transport route upstream of the plurality of transport roller pairs, wherein the controller sets the threshold in such a way that the threshold when the medium is not nipped in the separation roller pair is lower than the threshold when the medium is nipped in the separation roller pair.

4. The medium transport apparatus according to claim 2, wherein the medium transport route is a route along which the medium fed from the medium placement section is transported in a first direction, is curved downward and inverted, and is transported in a second direction that is opposite to the first direction, the medium transport route has a first zone and a second zone, a curvature of the medium within the first zone being lower than a curvature of the medium within the second zone, and the controller sets the threshold in such a way that the threshold when an upstream side of the medium is positioned within the first zone of the medium transport route is lower than the threshold when the upstream side of the medium is positioned within the second zone of the medium transport route.

5. The medium transport apparatus according to claim 1, wherein when transporting a first medium and a second medium, rigidity of the first medium being lower than rigidity of the second medium, the controller sets the threshold in such a way that the threshold during transport of the first medium is lower than the threshold during transport of the second medium.

6. An image read apparatus comprising:

a reader that reads a surface of a medium being transported; and the medium transport apparatus according to claim 1 which transports the medium.

7. The image read apparatus according to claim 6, wherein the controller sets a rotational speed of the motor to a lower value as the number of transport roller pairs that are transporting the medium increases, and the controller sets the rotational speed of the motor to a larger value as the number of transport roller pairs that are transporting the medium decreases.

8. The image read apparatus according to claim 6, wherein when transporting a first medium and a second medium, rigidity of the first medium being higher than rigidity of the second medium, the controller sets the rotational speed of the motor in such a way that the rotational speed during transport of the first medium is higher than the rotational speed during transport of the second medium.

9. A jam detection method using a medium transport apparatus that includes a medium placement section on which a medium to be transported is placed, a medium transport route along which the medium fed from the medium placement section is transported, a plurality of transport roller pairs disposed on the medium transport route, and a motor that operates as a power source for the plurality of transport roller pairs, the jam detection method in which the medium transport apparatus detects whether the medium jams on the medium transport route by referring to a drive load on the motor and a threshold related to the drive load, the jam detection method comprising:

determining how many transport roller pairs are transporting the medium, based on detection information from a plurality of detectors, the detectors being disposed on the medium transport route in relation to the respective transport roller pairs, the detectors being configured to detect the medium; and setting the threshold to a larger value as a number of transport roller pairs that are transporting the medium increases and setting the threshold to a lower value as the number of transport roller pairs that are transporting the medium decreases.

10. A non-transitory computer-readable storage medium storing a program, the program causing a medium transport apparatus to perform a jam detection method, the medium transport apparatus including a medium placement section on which a medium to be transported is placed, a medium transport route along which the medium fed from the medium placement section is transported, a plurality of transport roller pairs disposed on the medium transport route, and a motor that operates as a power source for the plurality of transport roller pairs, the jam detection method in which the medium transport apparatus detects whether the medium jams on the medium transport route by referring to a drive load on the motor and a threshold related to the drive load, the jam detection method comprising:

determining how many transport roller pairs are transporting the medium, based on detection information from a plurality of detectors, the detectors being disposed on the medium transport route in relation to the respective transport roller pairs, the detectors being configured to detect the medium; and setting the threshold to a larger value as a number of transport roller pairs that are transporting the medium increases and setting the threshold to a lower value as the number of transport roller pairs that are transporting the medium decreases.

* * * * *